Dec. 20, 1927.
W. B. CAROLUS
NUT SPLITTING TOOL
Filed Nov. 18, 1925
1,653,340
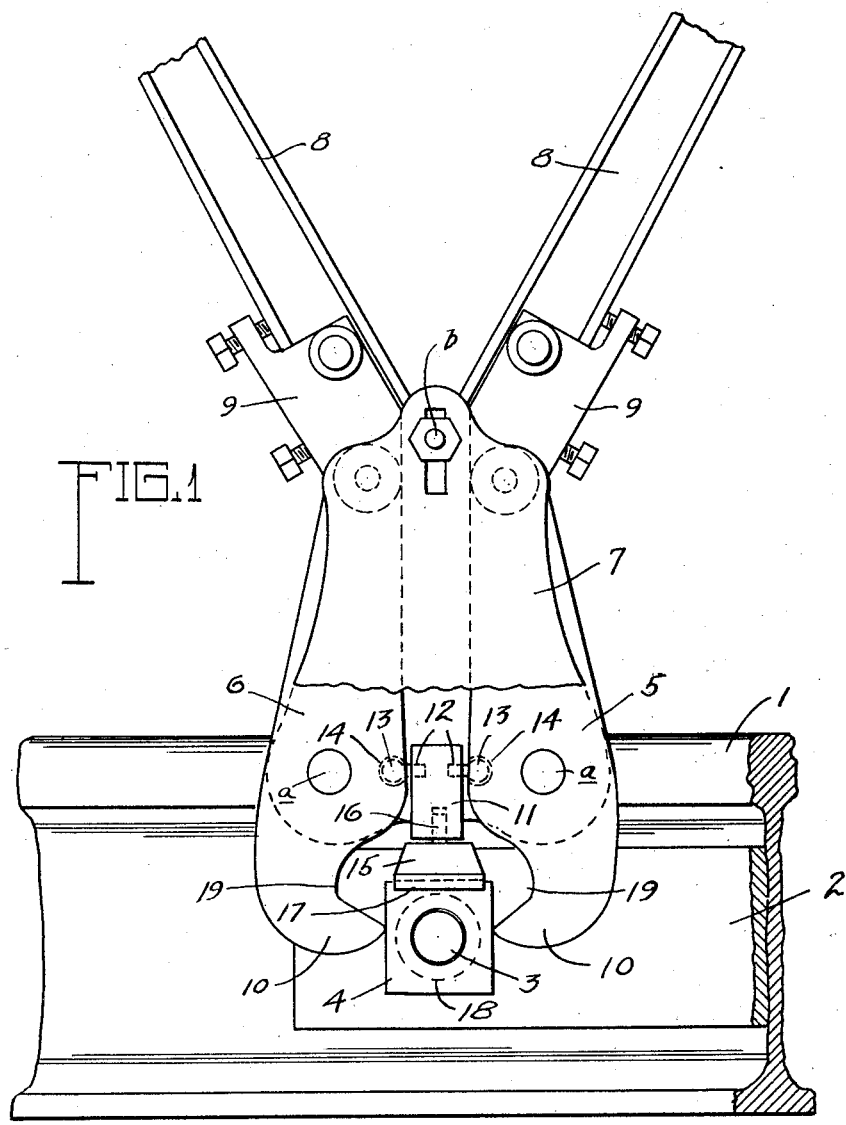
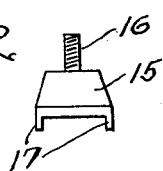
INVENTOR
William B. Carolus.
BY Walter N. Haskell.
his ATTORNEY Patented Dec. 20, 1927.

1,653,340

UNITED STATES PATENT OFFICE.

WILLIAM B. CAROLUS, OF STERLING, ILLINOIS, ASSIGNOR TO CAROLUS MANUFACTURING COMPANY, OF STERLING, ILLINOIS.

NUT-SPLITTING TOOL.

Application filed November 18, 1925. Serial No. 69,801.

My invention relates to a nut splitting tool, and has reference to a heavy type of such tools, designed more specially for the removal of large nuts, such as are used on railway joints. Some of these nuts become fixed in place so that it is impossible to remove them in the usual way, and the only way to displace them is by cutting them from the bolt. The best way to accomplish this appears to be by cutting through the sides of the nut, where there is the least material, and along lines passing centrally of the bolt. Ordinary bolt and nut cutting tools are totally unfitted for this class of work, not only for their insufficient size, but for lack of sufficient leverage and strength. In readjusting the tool for the larger use something more is required than the mere change in the size and strength thereof. For one thing the necessity for increased leverage calls for operating handles having a greater length, and to which the power is applied at a greater distance from the work, resulting in danger of the cutting elements slipping from place or getting out of their true position.

One of the purposes of the present invention is to provide a yieldable guiding means in connection with the tool, which will prevent its getting out of place.

Another object of the invention is to change the form of the tool, to better adapt it to the class of work hereinbefore mentioned.

Some of the features which are included in the present tool have been heretofore shown and pointed out in my former application for Letters Patent of the United States for a bolt and nut splitting tool, filed Feb. 14, 1925, Serial No. 9114.

The above named, and other features and advantages of the invention will more fully appear from the following specification, reference being had to the accompanying drawings, in which;—

Fig. 1 shows the invention in elevation, with some of the parts broken away, in position for use with railroad nuts.

Fig. 2 is an end view of the guide 15, detached.

The reference number 1 indicates the fragmentary part of a railroad rail, and 2 a plate such as are employed for holding the ends of the rails together. Passing through openings in the rail and plate is a bolt 3, upon which is fixed a nut 4.

The invention comprises a pair of jaws 5 and 6, pivoted between a pair of plates 7, as at $a$. Handles 8, shown partly broken away, have a pivotal connection with said jaws, by means of couplings 9, similar to the present construction of devices of this class. At the opposite ends from the handles the jaws are provided with beak-shaped cutters 10, the edges of which are of as great a width as the nut 3. The spacing of the pivots of the jaws 5 and 6 is such as to permit the cutters to embrace the sides of the nut, as shown in Fig. 1, when the jaws are open. Upon power being applied to the handles the cutters are forced into the sides of the nut, partly splitting the metal and partly wedging it asunder, until the nut is severed into two parts, which can be easily removed from the bolt.

In the operation of the tool, especially when it is being operated at a point near the ground, or in other awkward position, it is found advisable to provide a means for steadying the same, so that the cutters will not slip out of place, or get into a position to improperly perform the work. It is also essential that the steadying means, as set out herein, shall be capable of a certain amount of movement, so that the same may accommodate itself to the movement of the nut which is being severed. This is accomplished by means of a block 11, supported between the jaws 5 and 6 by pins 12 fixed therein, and provided on their outer ends with heads 13, held in spaces 14 in the edges of the jaws, as shown in broken lines, said spaces permitting a limited movement of the jaws with relation to the pins.

In the outer end of the block 11 is held a guide 15, by means of a threaded pin 16, engaged in a similarly threaded opening in the end of the block, permitting an adjustment of the position of the guide 15, so as to accommodate the same to nuts of different sizes. The guide 15 is provided with flanges 17, capable of embracing the upper edge of the nut 4, and holding the head of the tool and cutters thereof in proper position for performing the operation, and preventing the guide from slipping on the nut. The pins 12 are in substantial alignment with the pivots $a$, and upon the closing movement of the jaws the pins and block will recede gradually, corresponding with the upward movement of the upper part of the nut 4 as the cutting operation proceeds. This is caused by the rocking movement of the jaws 5 and 6 on the pivots $a$, and is in proportion to the movement of said jaws. The guide 15 is thereby permitted to accommodate itself to the movement of said upper half of the nut. At the same time the contact of the guide with the nut operates to maintain the cutters in their true positions, and prevents said cutters from making a slicing cut, which would leave the larger part of the nut still engaged with the bolt. To work properly the distance between the guide 15 and a line drawn between the cutting edges of the cutters 10 should equal one-half of the width of the nut 4, and the position of the guide can be adjusted by turning the same in its seat, as hereinbefore mentioned.

In railroad construction it is customary to support the nuts at a little distance from the rail, as by a washer or collar, as shown in broken lines at 18, so that it is an easy matter to position the tool and guide on the nuts. The flanges 17 of the guide hold the cutters from lateral movement in either direction.

In providing the cutters 10 at the ends of the jaws recesses 19 are formed, which furnish ample space for the operation of the nut and guide 15.

As has been hereinbefore observed, the invention is designed for work of an extremely heavy character, and all of the parts are formed with reference thereto, and with the idea that the same may be operated by more than one workman, if desired, without injury to the tool.

What I claim, and desire to secure by Letters Patent, is:

A device of the class described, comprising a pair of pivotally mounted jaws provided with operating handles, beak-shaped cutters at the ends of said jaws in opposition to each other, a support held between said jaws, in line with the pivots thereof, so as to recede gradually with the action of said jaws, and a contact member carried by said support, and adapted for engagement with the object being operated on by said cutters.

In testimony whereof I affix my signature.

WILLIAM B. CAROLUS.